United States Patent
Baumgartner et al.

(10) Patent No.: US 8,286,759 B2
(45) Date of Patent: Oct. 16, 2012

(54) PNEUMATICALLY ACTUATABLE DISC BRAKE AND BRAKE CYLINDER

(75) Inventors: Johann Baumgartner, Moosburg (DE); Robert Gruber, Pfaffing (DE); Aleksandar Pericevic, Munich (DE); Steffen Geissler, Rodgau (DE); Robert Trimpe, Wessling (DE)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 95 days.

(21) Appl. No.: 12/981,704

(22) Filed: Dec. 30, 2010

(65) Prior Publication Data

US 2011/0147139 A1    Jun. 23, 2011

Related U.S. Application Data

(63) Continuation of application No. PCT/EP2009/004787, filed on Jul. 2, 2009.

(30) Foreign Application Priority Data

Jul. 4, 2008    (DE) ................. 10 2008 031 443

(51) Int. Cl.
*F16D 55/08*    (2006.01)
(52) U.S. Cl. .............. 188/72.9; 188/71.7; 188/71.8; 188/71.9
(58) Field of Classification Search ............ 188/71.7, 188/71.8, 71.9; 303/20, 3, 15
See application file for complete search history.

(56) References Cited

U.S. PATENT DOCUMENTS

| | | | | |
|---|---|---|---|---|
| 1,648,120 A | * | 11/1927 | Harrison | 369/152 |
| 3,944,030 A | * | 3/1976 | Yokoyama | 188/298 |
| 3,983,790 A | | 10/1976 | Johannesen | |
| 5,400,875 A | * | 3/1995 | Anthony et al. | 188/72.9 |
| 5,433,298 A | * | 7/1995 | Antony et al. | 188/72.7 |
| 5,449,052 A | * | 9/1995 | Macke et al. | 188/71.9 |
| 5,515,949 A | * | 5/1996 | Baumgartner et al. | 188/72.9 |
| 5,547,048 A | * | 8/1996 | Anthony | 188/72.9 |
| 5,582,273 A | * | 12/1996 | Baumgartner et al. | 188/72.6 |
| 5,697,474 A | * | 12/1997 | Antony et al. | 188/72.6 |

(Continued)

FOREIGN PATENT DOCUMENTS

DE    197 56 519 A1    10/1998

(Continued)

OTHER PUBLICATIONS

German Office Action dated Jun. 29, 2009 including English-language translation (Six (6) pages).

(Continued)

*Primary Examiner* — Robert A Siconolfi
*Assistant Examiner* — James Hsiao
(74) *Attorney, Agent, or Firm* — Crowell & Moring LLP

(57) ABSTRACT

A pneumatically actuatable disc brake has a caliper straddling a brake disc. One brake pad on an application side being actuatable by a rotary lever of a brake application device. A brake cylinder, which can be pressurized using air pressure, is attached to a flange of calliper. The brake cylinder engages into the rotary lever via a cylinder plunger and has a return spring for returning the cylinder plunger to an unstressed initial position. The return spring abuts against the base of a cover supported on the flange. The disc brake is configured such that a self-energizing device is provided having a self-energizing factor selected such that the brake automatically releases itself after braking. The flange forms an abutment for the return spring.

20 Claims, 5 Drawing Sheets

U.S. PATENT DOCUMENTS

| | | | |
|---|---|---|---|
| 5,833,035 A * | 11/1998 | Severinsson | 188/72.7 |
| 6,234,587 B1 * | 5/2001 | Gerum et al. | 303/118.1 |
| 6,269,732 B1 * | 8/2001 | Ando et al. | 91/376 R |
| 6,899,204 B2 * | 5/2005 | Baumgartner et al. | 188/72.9 |
| 6,988,443 B2 | 1/2006 | Morris | |
| 7,114,597 B2 | 10/2006 | Siebke | |
| 7,240,773 B2 * | 7/2007 | Baumgartner | 188/71.9 |
| 7,258,206 B2 | 8/2007 | Severinsson | |
| 7,267,207 B2 | 9/2007 | Fischer et al. | |
| 7,367,433 B2 * | 5/2008 | Bieker et al. | 188/71.7 |
| 7,673,722 B2 * | 3/2010 | Linke | 188/72.9 |
| 7,757,819 B2 * | 7/2010 | Chen | 188/20 |
| 7,891,470 B2 * | 2/2011 | Roberts et al. | 188/72.9 |
| 2004/0074709 A1 * | 4/2004 | Krug et al. | 188/72.1 |
| 2004/0182659 A1 * | 9/2004 | Siebke | 188/167 |
| 2004/0250679 A1 | 12/2004 | Morris | |
| 2006/0124406 A1 * | 6/2006 | Baumgartner | 188/71.8 |
| 2007/0063580 A1 * | 3/2007 | Scheckelhoff et al. | 303/115.1 |
| 2009/0159383 A1 | 6/2009 | Roberts et al. | |
| 2009/0188761 A1 | 7/2009 | Baumgartner et al. | |
| 2009/0258119 A1 | 10/2009 | Nevalainen et al. | |

FOREIGN PATENT DOCUMENTS

| | | |
|---|---|---|
| DE | 199 35 629 A1 | 2/2001 |
| DE | 102 36 923 A1 | 5/2003 |
| DE | 103 30 633 A1 | 12/2004 |
| DE | 10 2006 036 279 B3 | 4/2008 |
| EP | 0 743 469 B1 | 11/1996 |
| WO | WO 98/26968 A1 | 6/1998 |
| WO | WO 2007/082658 A1 | 7/2007 |

OTHER PUBLICATIONS

International Search Report dated Sep. 18, 2009 including English-language translation (Six (6) pages).

* cited by examiner

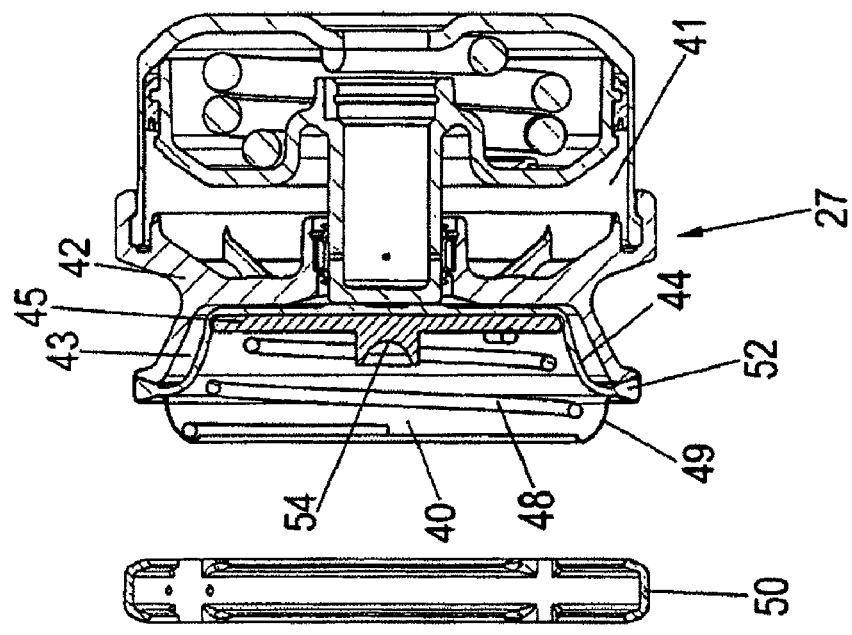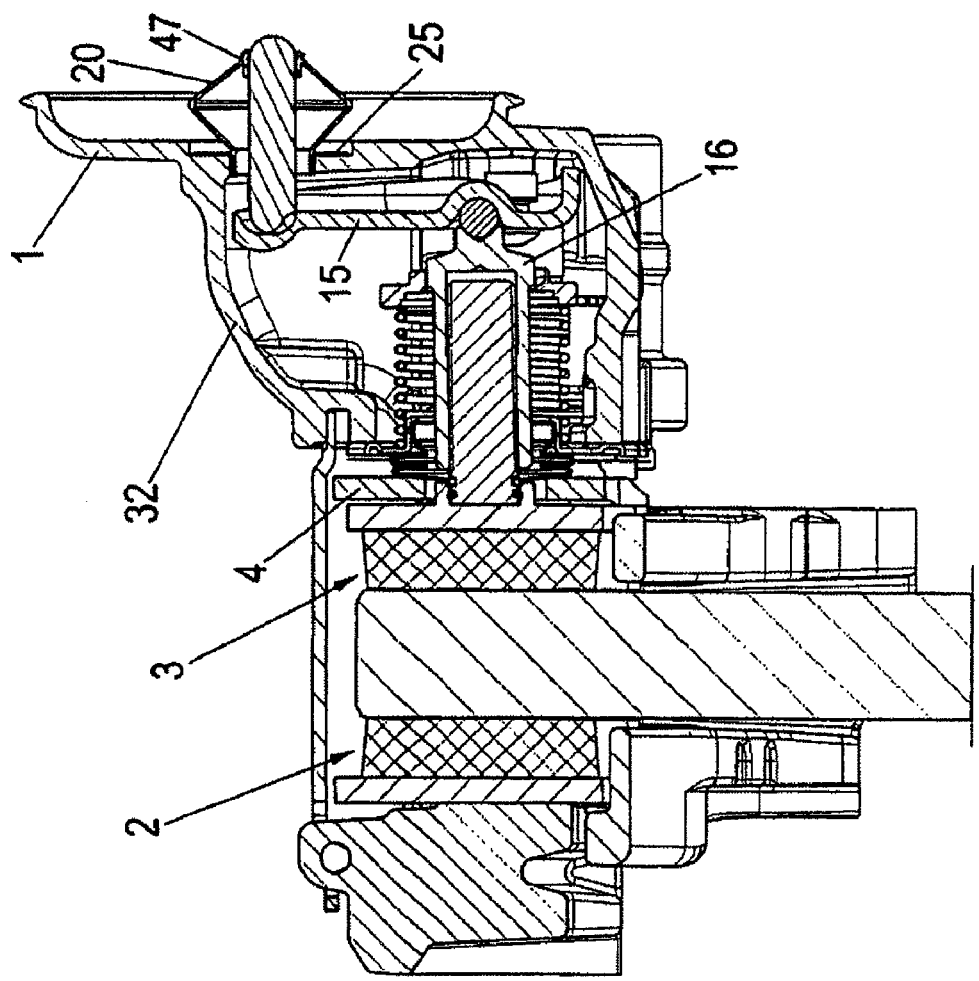
Fig. 2

PNEUMATICALLY ACTUATABLE DISC BRAKE AND BRAKE CYLINDER

CROSS-REFERENCE TO RELATED APPLICATIONS

This application is a continuation of PCT International Application No. PCT/EP2009/004787, filed Jul. 2, 2009, which claims priority under 35 U.S.C. §119 from German Patent Application No. DE 10 2008 031 443.9, filed Jul. 4, 2008, the entire disclosures of which are herein expressly incorporated by reference.

BACKGROUND AND SUMMARY OF THE INVENTION

The invention relates to a pneumatically actuatable disc brake having a caliper straddling a brake disc. Brake pads can be applied to each side of the brake disc, of which an application-side brake pad is actuatable by an application device, preferably with a rotary lever of the application device. A brake cylinder, which can be pressurized with compressed air, is fastened to a flange of the brake caliper, which brake cylinder engages on the rotary lever via a cylinder plunger and has a return spring with which the cylinder plunger can be returned to an unloaded starting position The invention also relates to a brake cylinder which can be pressurized with compressed air.

A pneumatically actuatable disc brake of this type is known, for example, from EP 0 743 469 B1.

In this case, the brake cylinder is fastened directly to a flange of the caliper by use of bolts, the position of the brake cylinder on the brake, and therefore also the location of the compressed air connections, being determined by the bolts, whereby installation variants of the cylinder according to different installation conditions are produced.

In order to provide suitably high air pressure for actuating the rotary lever, corresponding dimensioning of the brake cylinder is required, resulting in a considerable number of disadvantages.

Because of the shocks and vibration that occur while the vehicle is being driven, the screw connections between the brake cylinder and the brake caliper must be of sturdy construction, as must a brake cylinder cover through which the fastening screws pass and against the inner wall of which the return spring also bears.

Moreover, the center of gravity of the brake cylinder is located relatively far from the connection region with the caliper, so that a correspondingly high bending moment is exerted on the fastening screws, requiring a design of the screws adapted accordingly.

Furthermore, the relatively great overall length of the brake cylinder determined by its function conflicts with the demands for optimization both of overall dimensions and of weight.

The plunger or piston of the brake cylinder passes through an opening present in the flange of the caliper, which opening is sealed from a secondary chamber of the brake cylinder by a bellows surrounding the plunger for this purpose.

A displacement volume corresponding to the stroke of the plunger is produced by compression or extension of the bellows, which displacement volume brings about pressure changes in the hermetically sealed caliper. Under heavy braking an overpressure of up to 0.4 bar can thereby be produced.

This problem can be solved according to the invention, as is considered in more detail hereinafter with reference to an example.

In such an overpressure phase, especially if a leak to the environment is present, air escapes to the outside, so that an under pressure is produced as the brake cylinder is retracted after braking.

A comparable effect is also produced by temperature fluctuations, to which a brake is heavily exposed by virtue of its function. In this case the air in the caliper expands upon heating while it contracts upon cooling.

Since the disc brakes preferably used in commercial vehicles are frequently operated in a weather-related moist or wet environment, if the aforementioned leak is present water is sucked into the interior of the brake in underpressure phases, which can lead, for example, to corrosion of mechanical components with the danger of complete failure of the brake.

The aforementioned long actuation strokes which must be executed give rise to a fragile sealing arrangement located far from the caliper, which is problematic with regard to handling and transportation of the disc brake parts before assembly, that is, before the brake cylinder has been installed, so that there is a risk of damage to the seal before installation of the brake cylinder on the brake caliper.

It is the object of the invention to develop a pneumatically actuatable disc brake and a brake cylinder such that they are optimized with regard to weight and installation space, that their service life is increased and that connections to the brake cylinder can be made in a simpler and more cost-effective manner (venting of position-dependent variant).

This and other objects are achieved by a disc brake, and associated brake cylinder, having a caliper straddling a brake disc. Brake pads can be applied to each side of the brake disc, of which an application-side brake pad is actuatable by an application device, preferably with a rotary lever of the application device. A brake cylinder, which can be pressurized with compressed air, is fastened to a flange of the brake caliper, which brake cylinder engages on the rotary lever via a cylinder plunger and has a return spring with which the cylinder plunger can be returned to an unloaded starting position. The return spring bears against the flange or against the base of a cover supported on the flange. The flange forms an abutment for the return spring Advantageously, the flange forms an abutment for the return spring directly, or optionally via an interposed thin sheet metal covering foil which acts not only as an abutment.

Because of the small dimensions and low weight, the attachment of the brake cylinder to the caliper can therefore be considerably optimized, as compared to the previous embodiments. The cylinder may advantageously also form a preassembled unit without the cylinder plunger.

In addition, as a result of a self-energizing device, which has been used hitherto in electromechanically actuatable disc brakes, the power consumption of the brake cylinder is reduced, resulting in a substantially reduced space requirement with the same operating behaviour of the brake.

Even with relatively small self-energizing factors, a considerable reduction in the overall size of the brake cylinder and of a spring brake actuator is possible. In this case the self-energization is selected by suitable dimensioning of wedge or ramp angles in such a manner that reliably automatic release of the brake occurs even with a maximum possible coefficient of friction of the brake pads.

In contrast to electric-motor driven disc brakes, therefore, the power generator for applying the brake does not also need to be used for releasing the brake.

The reduction in overall dimensions is made possible, in particular, by the shorter stroke which, with a boost ratio of, for example, 2.7 and an adapted transmission ratio of the brake, is reduced from, for example, 65 mm hitherto to 24 mm.

Moreover, this short stroke has the result that the bellows surrounding the plunger can be configured to be very compact and, in the simplest case, is implemented with only one fold, the bellows with a steel-reinforced sealing seat being inserted directly into the through-opening at the interface of the brake cylinder with the caliper, and specifically into the opening of the caliper through which the plunger passes.

In principle, the plunger may be in two parts, consisting of a cylinder plunger, an end face of which rests against the brake lever, and a plunger plate which has an approximately cup-shaped depression into which the other end of the cylinder plunger is fitted. The plunger plate forms with a diaphragm the diaphragm piston which divides brake cylinder chambers formed, and which is pressurized with compressed air during braking. The cylinder may also be in the form of a pure diaphragm cylinder which does not have a spring brake actuator section.

Because of the small dimensions and low weight, the attachment of the brake cylinder to the caliper can be optimized in comparison to the previous configurations. Thus, the cover which closes the brake cylinder on its side oriented towards the flange may be implemented as a thin-walled sheet metal formed part, of the type of a largely dimensionally stable metal foil, against which one end of the return spring abuts while the other end bears against the plunger plate (diaphragm plate).

In this case the cover fits into the pot-shaped flange of the caliper which forms an abutment for the return spring, since the thickness of the sheet metal of the cover may be selected to be small enough that deformation-free abutment of the return spring against the cover would not be possible.

Preferably, the return spring is designed with the aim of bearing, directly or via a thin foil-like cover, against a flange of the disc brake as an abutment.

Minimization of the thickness of the cover also leads to weight reduction and to the elimination of fixing screws for fastening the brake cylinder to the caliper. Instead, the brake cylinder may be fastened to the caliper by way of a clamping strap, for example. For this purpose, firstly, the cover of the brake cylinder is configured as a rolled-in edge with which the diaphragm cylinder is retained on the brake cylinder housing. In this way, the brake cylinder is preassembled as a module with the brake cylinder housing, the diaphragm cylinder, the cover, the plunger plate and the return spring, while the cylinder plunger and the bellows are components of the preassembled caliper.

During assembly of the brake cylinder, the brake cylinder is simply placed on the pot-shaped flange of the caliper, the cylinder plunger centering itself practically automatically in the cup-shaped receptacle of the plunger plate.

A further advantage of the disc brake according to the invention will now be considered. With a conventional brake, the following is, for example, the case:

With a complete stroke of a known brake the displacement volume of the cylinder plunger in the bellows is 65 cm$^3$.

With a stroke of 4.1 (i=15.6), the absorption volume of the extending plunger, optionally with bellows, is approximately 16.5 cm$^3$.

The volume change $\Delta V$ is therefore:

$$\Delta V = 65 - 16.5 = 48.5 \text{ cm}^3.$$

With a self-energizing brake according to the invention, by contrast:

With a complete stroke of 30 cm the displacement volume of the cylinder plunger with bellows is approximately 30.5 cm$^3$.

By contrast, with one of 4.16 cm (i=7.2) the absorption volume of the three extendable plungers with bellows is approximately 2.5 cm$^3$.

Therefore:

$$\Delta V = 30.5 - 25 = 5.5 \text{ cm}^3.$$

The remaining volume change is insignificant and, with adapted dimensioning of the bellows, can be completely eliminated. Problems caused by underpressure or overpressure, as described in the introduction, are therefore avoided to a very large extent.

Other objects, advantages and novel features of the present invention will become apparent from the following detailed description of one or more preferred embodiments when considered in conjunction with the accompanying drawings.

BRIEF DESCRIPTION OF THE DRAWINGS

FIGS. 2 to 4 show the disc brake in different assembly positions; and

DETAILED DESCRIPTION OF THE DRAWINGS

Figure 5:
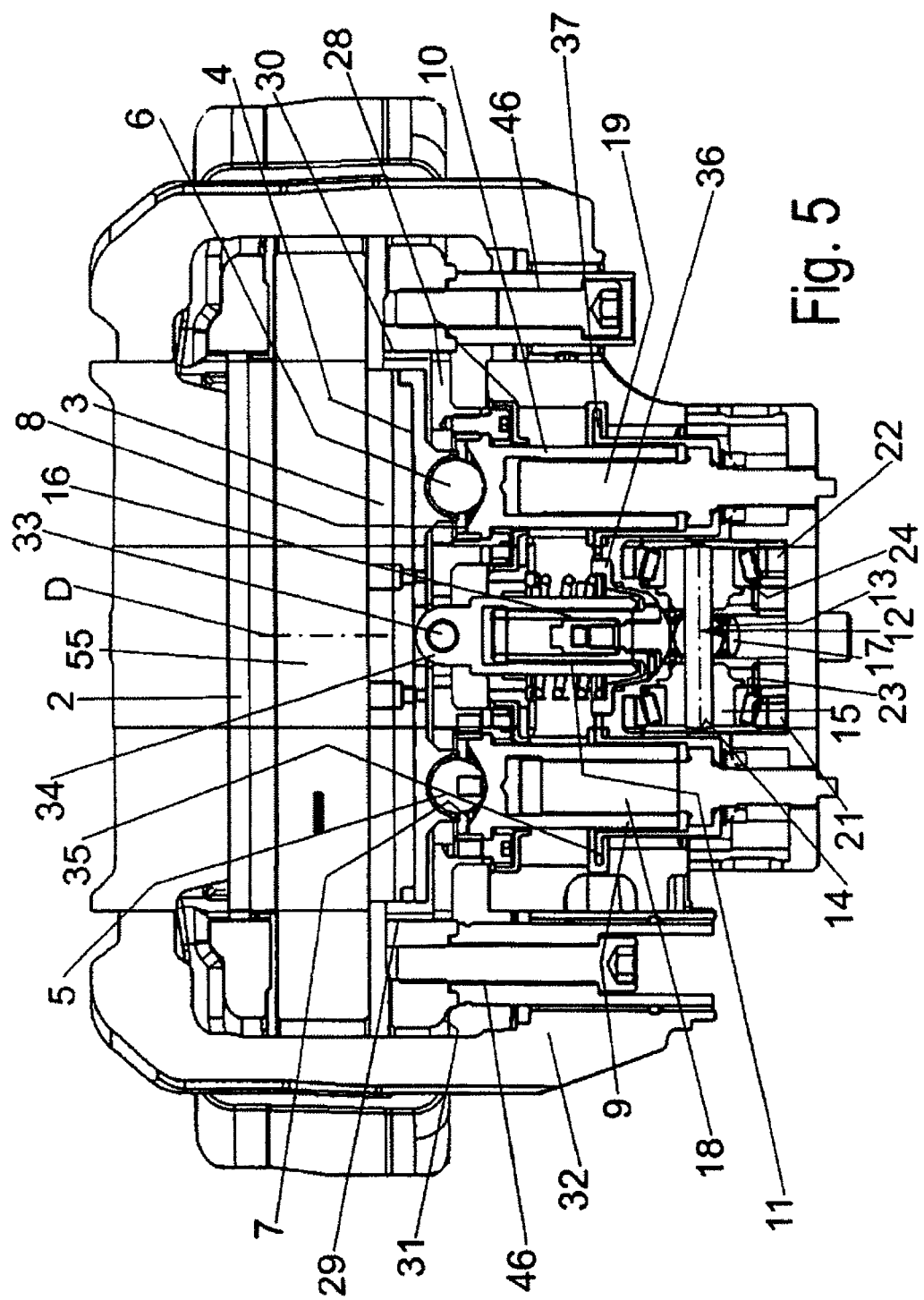
FIG. 5 is a partly sectional schematic top view of a detail of the disc brake.

FIG. 5 shows a sliding-caliper disc brake with brake pads 2, 3 arranged on each side of a brake disc 55. This configuration as a sliding-caliper disc brake is a possible construction. Configurations as a hinged-caliper disc brake or as a fixed-caliper disc brake or hybrid forms of the constructions are also possible but are not represented here.

The sliding-caliper disc brake has a caliper 32 which accommodates an application device. The caliper 32 is guided displaceably by way of a caliper sliding guide 46 on a brake carrier 31 fixed to the axle.

A brake cylinder 27 shown in FIGS. 1 to 4 for actuating the brake is, in operation, arranged on the caliper 32 and acts via a cylinder plunger 26 on a brake application device having a rotary lever 15, which is mounted preferably eccentrically in the caliper 32 and which can be swiveled by the cylinder plunger 26 upon actuation of the brake.

Figure 1:
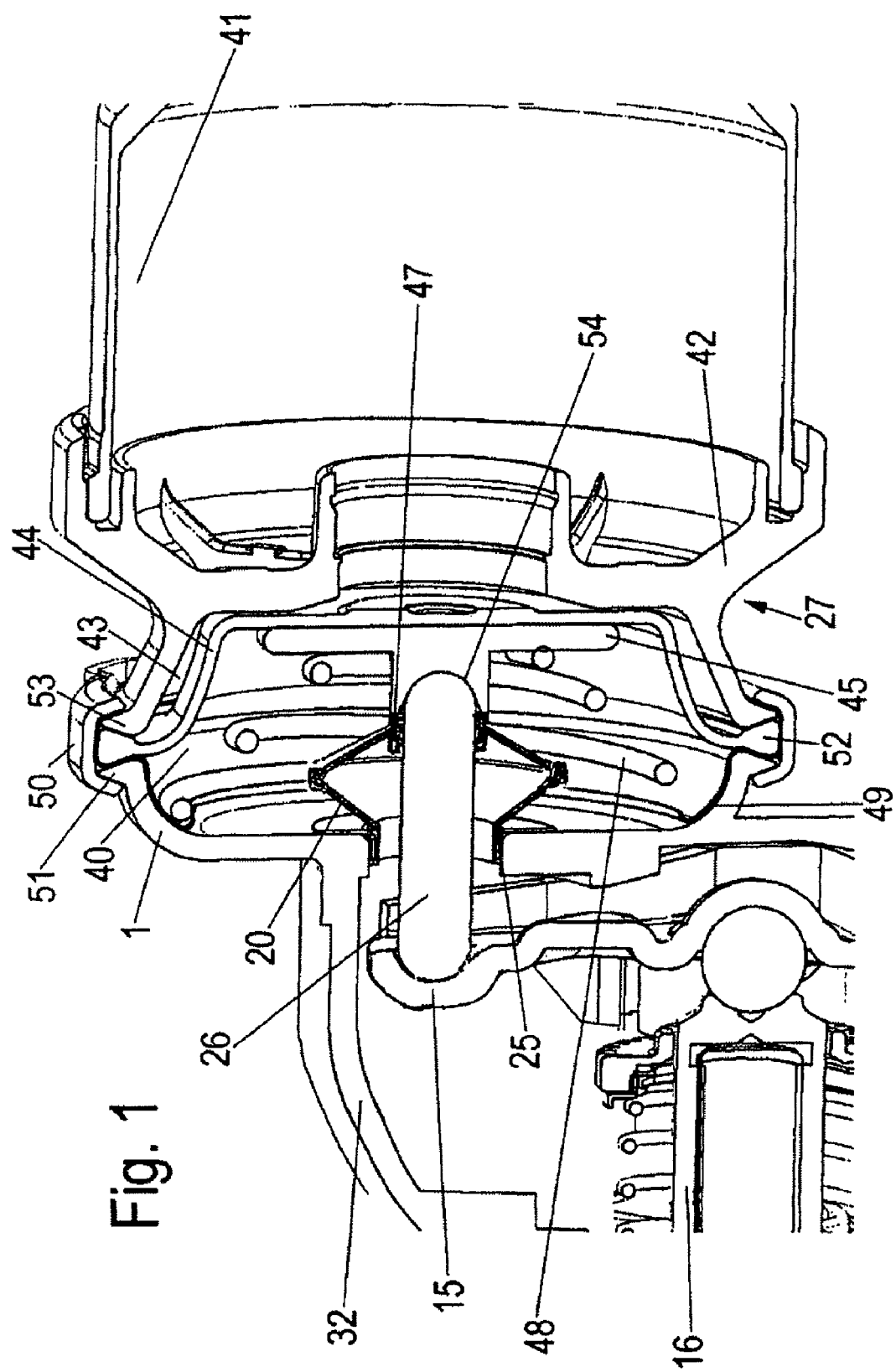
FIG. 1 is a sectional side view of a detail of a disc brake according to an embodiment of the invention.
Figure 3:
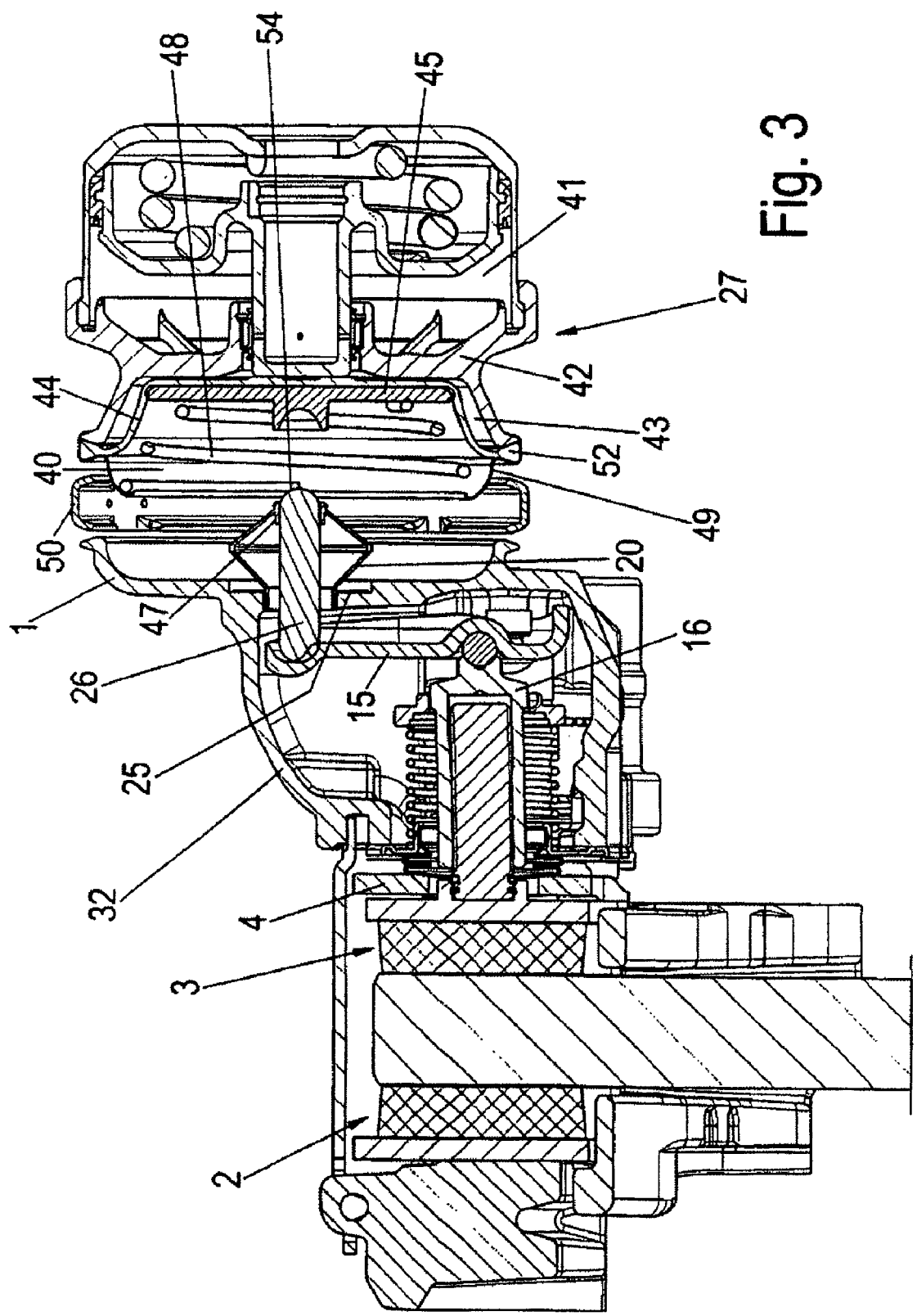
Figure 4:
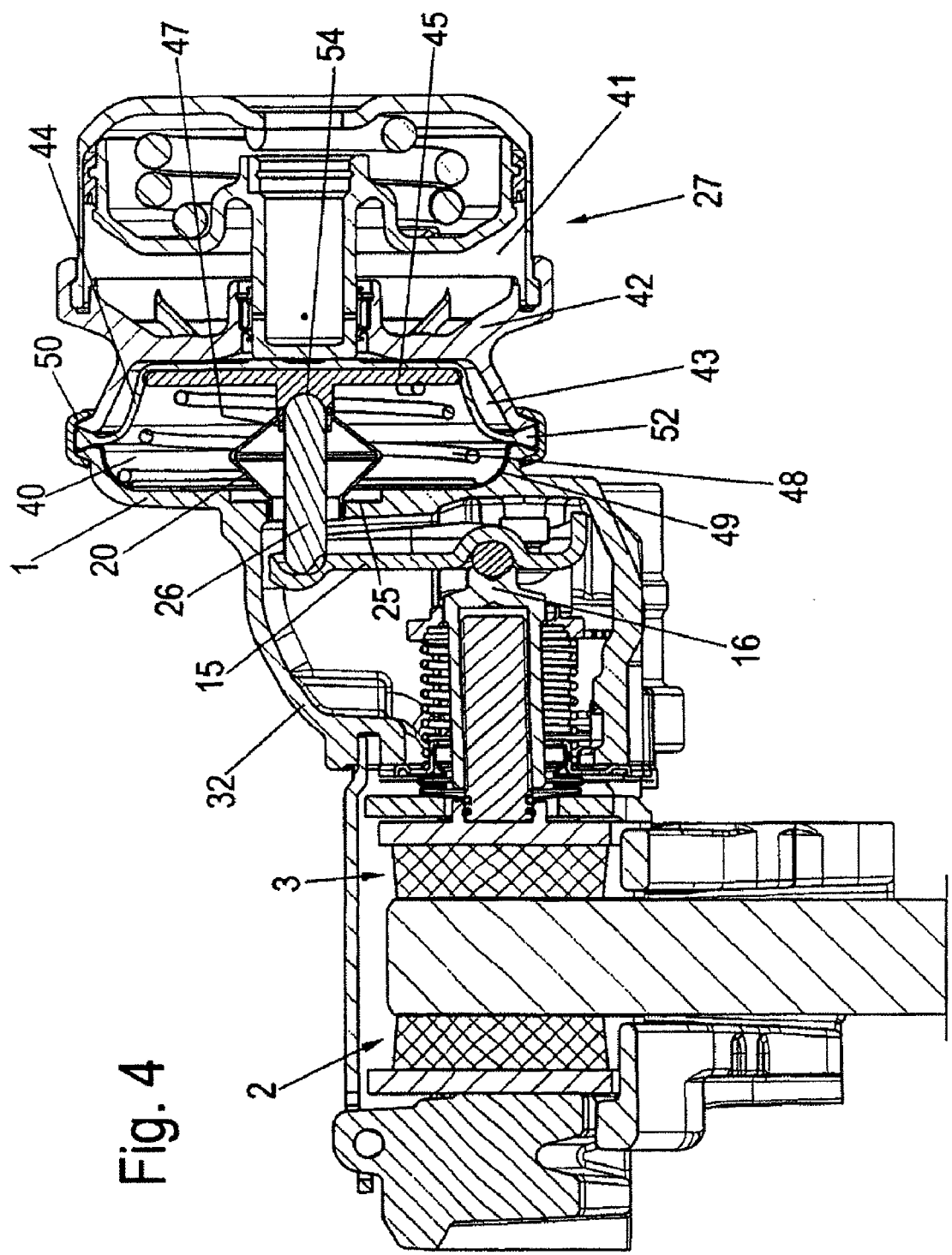

FIGS. 2 and 3 each show the disc brake before installation of the brake cylinder 27, while FIGS. 1 and 4 show the installed position of the brake cylinder 27 on the brake caliper 1.

In FIGS. 2 and 3, it can be clearly seen that the brake cylinder 27 forms a separate constructional unit and is closed in the outer edge region, in the end region oriented towards the caliper 1, by a cover 49 provided with a concentric opening through which the actuating or cylinder plunger 26 can preferably pass.

To provide the connection, a flange 1 is formed integrally on the caliper 32, which flange 1 has a pot-shaped configuration and, on the inner side, a concavely formed wall which merges into a radially outward-directed circumferential collar 51 (see FIG. 1).

The brake cylinder 27 is fastened to the flange 1, for which purpose there is provided a clamping ring 50 which extends around and clamps together the collar 51 on one side and a collar 53 of a brake cylinder housing 42.

Clamped between the two collars 51, 53 is a circumferential bead 52 which is molded integrally on a diaphragm cylinder 44, which divides the brake cylinder 27 into a service brake section 40 and a chamber 43 which can be pressurized with compressed air.

A plunger plate 45 with a recess configured as a cup 54, in which an end of the cylinder plunger 26 engages, is fastened to the end face of the diaphragm cylinder 44 oriented towards the flange 1.

The cylinder plunger 26 passes through an opening in the flange 1, which opening holds a sealing ring 25 for receiving a bellows 20, the other side of which bellows 20 fits closely around the cylinder plunger 54 with a seal 47, the seal 47 being fixed to the cylinder plunger 26.

The bellows, which in the example has only one fold, separates the service brake section 40 hermetically from the interior of the caliper 32.

As preassembled components, the caliper 32 is fitted with the cylinder plunger 26 and the bellows 20, and the brake cylinder 27 is covered in its outer edge region, on its side oriented towards the flange 1, by the cover 49.

The cover 49 extends around both the bead 52 and the collar 53 of the brake cylinder housing 42, and further serves as an abutment for a return spring 48, the other end of which bears against the plunger plate 45.

In this case the contour of the cover 49 is adapted to the flange 1; that is to say that it has a convex configuration on the outside and fits into the concave wall of the flange 1.

The flange 1 consequently serves as an abutment for the return spring 48 which, in the inoperative position, and therefore also during transportation of the brake cylinder 27 as a preassembled module, is largely relaxed.

As the brake lever 15 swivels in the aforementioned manner in the event of braking, it acts by way of at least one brake plunger 11 directly or via a pressure plate 4 on the application-side brake pad 3 (FIG. 5).

In this case the brake plunger 11 and the rotary lever 15, as well as the brake plunger 11 and the pressure plate 4, are articulated to one another in such a manner that upon application of the disc brake the brake plunger 11 can follow completely or at least substantially a movement of the application-side brake pad 3 in the circumferential direction of the brake disc 55, the application device being designed such that pressure forces can act on the brake pad 3.

The brake pad 3 on the application side is arranged in the pressure plate 4, which is displaceable parallel to the brake disc friction surface and which is operatively connected, via rolling bodies in the form of balls 5 and 6 mounted therein, to wedge-shaped ramps 7, 8 of pressure plungers 9, 10 of axially variable length, which ramps 7, 8 are oriented at an acute angle of more than 9° and less than 90° to the brake disc friction surface.

In a supplementary manner, the ramps 7, 8 might also be formed in the pressure plate 4. In this case the balls 5, 6, or other suitable rolling bodies, would be guided in cup-shaped recesses in the pressure plungers 9, 10, which nevertheless would form part of the self-energizing device.

As already mentioned, the brake plunger 11 is articulated to the pressure plate 4 in order to transmit the pressure and tension forces acting in the direction of the brake disc 55. This articulation is effected here by means of a pin 33 with a forked head 34.

In the event of a circumferential displacement of the pressure plate 4, this articulated connection permits the brake plunger 11 to execute a swiveling movement about the spherical center 12 (which lies on the axis of rotation of the eccentric) of a cup bearing 13.

The cup bearing 13 is received on the eccentric spindle 14 of the rotary lever 15 in order to transmit the actuation forces to the brake plunger 11. The brake plunger 11 is screwed to a threaded plunger 16, which in turn is connected rigidly to a joint bearing housing 17.

The brake plunger 11 forms with the threaded plunger 16 a length-variable plunger or adjustment piston for the purpose of adjusting for wear.

In the same way, the two pressure plungers 9, 10 are screwed to the threaded spindles 18, 19, which transmit the reaction force of the pressure plungers 9, 10 to the caliper 32.

The threaded spindles 18, 19 are connected to the threaded plunger 16 by a synchronizing transmission. It is thereby achieved that the rotary drive motion of the adjustment drive acts only synchronously on the two pressure plungers 9, 10 and on the brake plunger 11.

The rotary lever 15 is mounted in a low-friction manner in two bearing blocks 21, 22 by way of two rolling bearings 23, 24, the bearing blocks 21, 22 being rigidly connected to the brake caliper 32.

The ends of the pressure plungers 9, 10 oriented towards the brake disc 55 are received or implemented in a guide plate 28 in such a manner that reaction forces acting on the ramps 7, 8 parallel to the brake disc friction surface are transmitted to the guide plate 28 and from there, depending on the direction of rotation of the brake disc 55, to the guide faces 29 or 30 on the brake carrier 31.

The guidance of the pressure plungers 9, 10 and of the brake plunger 11 is effected at their ends oriented towards the brake disc 55 solely via the guide plate 28 and the brake carrier 31.

The caliper 32 and the adjustment device transmission 35, 36, 37, as well as the caliper sliding guide, are relieved of the circumferential forces. Furthermore, the brake plungers 9, 10 are preferably simply screwed or press-fitted directly to the guide plate 28.

A braking process with this disc brake is described below in an exemplary manner.

Upon detection of a braking request via actuation of the brake pedal and therefore of the brake set-point adjuster connected to the brake pedal, the brake cylinder 27 is pressurized with compressed air so that the cylinder plunger 26 is moved as the diaphragm 44 is deflected.

As this happens, the rotary lever 15 is swiveled in its rolling bearings 23, 24 and therefore also moves its eccentric shaft 14 and therefore the cup bearing 13, according to the lever ratio, in the direction of the brake disc 55. The movement of the cup bearing 13 is transmitted to the pressure plate 4 via the brake plunger 11 or via the component chain 12=>13=>17=>16=>11=>33=>34.

As this happens, the pressure plate 4 is first moved towards the brake disc 55 perpendicularly to the friction surface thereof in order to eliminate the free play with the brake pad 3. Upon application of the brake pad 3 to the friction surface of the brake disc 55, the brake pad 3 and the pressure plate 4 connected thereto are entrained by the brake disc 55 in the direction of rotation thereof by the frictional force produced.

The balls 5, 6 are guided along the ramps 7, 8 and thereby produce on the pressure plate 4, as a self-energizing device, a boosted movement towards the brake disc 55, in addition to the circumferential movement thereof.

The application force applied by the brake plunger 11 is thus increased, correspondingly to the increased bracing apart of the caliper 32. As a result of the circumferential displacement of the pressure plate 4, the brake plunger 11 executes a swiveling movement around the cup bearing 13 and the pin 33.

In sliding caliper disc brakes, the brake pad 2 on the reaction side is usually applied to the brake disc 55 as a result of a displacement of the brake caliper. No self-energizing device needs to be provided here.

The brake cylinder 27 is here in the form of a combined cylinder with the service brake section 40 and a parking brake section 41.

| Table of Reference Numerals | |
| --- | --- |
| Flange | 1 |
| Brake pads | 2, 3 |
| Pressure plate | 4 |
| Balls | 5 and 6 |
| Ramps | 7 and 8 |
| Pressure plungers | 9 and 10 |
| Brake plunger | 11 |
| Spherical center | 12 |
| Cup bearing | 13 |
| Eccentric spindle | 14 |
| Rotary lever | 15 |
| Threaded plunger | 16 |
| Joint bearing housing | 17 |
| Threaded spindles | 18 and 19 |
| Bellows | 20 |
| Bearing blocks | 21/22 |
| Rolling bearings | 23/24 |
| Sealing ring | 25 |
| Cylinder plunger | 26 |
| Brake cylinder | 27 |
| Guide plate | 28 |
| Guide faces | 29 or 30 |
| Brake carrier | 31 |
| Caliper | 32 |
| Pin | 33 |
| Forked head | 34 |
| Adjustment mechanism | 35/36/37 |
| Service brake section | 40 |
| Parking brake section | 41 |
| Brake cylinder housing | 42 |
| Chamber | 43 |
| Diaphragm cylinder | 44 |
| Plate | 45 |
| Caliper sliding guide | 46 |
| Seal | 47 |
| Return spring | 48 |
| Cover | 49 |
| Clamping ring | 50 |
| Collar | 51 |
| Bead | 52 |
| Collar | 53 |
| Cup | 54 |
| Brake disc | 55 |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A pneumatic disc brake having a brake disc, comprising:
a caliper configured to straddle the brake disc;
a brake application device arranged in a housing section of the caliper for applying an application-side brake pad against the brake disc, the brake application device having a rotary lever;
a brake cylinder pressurizable with compressed air, the brake cylinder being fastened to a flange of the caliper;
wherein the brake cylinder engages the rotary lever of the brake application device via a cylinder plunger, a return spring of the brake cylinder being operatively configured to return the cylinder plunger to an unloaded position, the return spring bearing against one of the flange of the caliper and a base of a thin wall cover requiring support on the flange of the caliper; and
wherein the flange of the caliper forms an abutment for operational use of the return spring of the brake cylinder.

2. The disc brake according to claim 1, further comprising a self-energizing device with a self-energizing factor operatively designed to automatically release the brake after braking.

3. The disc brake according to claim 1, wherein the flange of the caliper has a base and a concavely formed side wall, the cover being adapted to fit against an inner side of the concave side wall of the flange.

4. The disc brake according to claim 3, wherein the cover is formed of a thin-walled sheet metal and comprises a concentric opening for the cylinder plunger.

5. The disc brake according to claim 4, wherein the cover is operatively configured to clamp a circumferential edge of a diaphragm cylinder on a brake cylinder housing of the brake cylinder.

6. The disc brake according to claim 5, wherein the circumferential edge of the diaphragm cylinder is formed as a bead.

7. The disc brake according to claim 6, wherein the cover retains the bead on a collar of the brake cylinder housing, the cover extending around the bead and the collar.

8. The disc brake according to claim 1, further comprising a bellows partially enclosing the cylinder plunger, the bellows fitting sealingly against an opening of the flange on one side and against the cylinder plunger on the other side.

9. The disc brake according to claim 1, wherein an end of the cylinder plunger oriented away from rotary lever fits into a plunger plate fastened to an underside of a diaphragm cylinder oriented toward the flange of the caliper.

10. The disc brake according to claim 9, wherein the end of the cylinder plunger is crowned and fits into a cup of the plunger plate.

11. The disc brake according to claim 7, further comprising:
a clamping ring;
wherein the flange of the caliper has a circumferential, radially outwardly extending collar against which the cover rests, the clamping ring clamping the collar, the cover, the bead of the diaphragm cylinder and a collar of the brake cylinder housing against one another to couple the brake cylinder to the flange of the caliper.

12. The disc brake according to claim 1, wherein the application-side brake pad is movable in a direction both parallel to an axis of rotation of the brake disc and parallel to a friction surface of the brake disc.

13. A brake cylinder pressurizable with compressed air intended for use with a disc brake having a brake disc and a caliper with a flange, the brake cylinder comprising:
a brake cylinder housing;
a return spring arranged in the brake cylinder housing;
a cover having a base against which the return spring bears in the brake cylinder housing;
wherein the cover comprises a thin-walled sheet metal that is a largely dimensionally stable metal foil requiring support on the flange of the caliper for operational use of the return spring.

14. The brake cylinder according to claim 13, wherein the brake cylinder is a preassembled unit without having a cylinder plunger.

15. The brake cylinder according to claim 13, wherein the cover has a concentric opening operatively configured for receiving a cylinder plunger.

16. The brake cylinder according to claim 13, wherein the cover clamps a circumferential edge of a diaphragm cylinder of the brake cylinder against the brake cylinder housing.

17. The brake cylinder according to claim 16, wherein the circumferential edge is a beaded edge.

18. The brake cylinder according to claim 17, wherein the cover retains the beaded edge on a collar of the brake cylinder housing, the cover extending around the beaded edge and the collar.

19. A brake cylinder pressurizable with compressed air that is intended for use in a disc brake having a caliper with a flange for mounting the brake cylinder, the brake cylinder comprising:
 a brake cylinder housing;
 a return spring operatively arranged in the brake cylinder housing;
 wherein the return spring is operatively configured to bear directly or via a thin foil cover against the flange of the caliper when mounted, the flange the cover requiring support on the flange for operational use of the return spring, wherein the flange forms an abutment against which the return spring acts during braking.

20. A caliper of a pneumatic disc brake actuated by a brake cylinder, the caliper comprising:
 a brake disc section that straddles a brake disc;
 a housing section in which is housed a rotary lever brake application device operated by the brake cylinder;
 wherein an end of the housing section facing away from the brake disc includes an opening through which the rotary lever brake application device is operated, a flange surrounding said opening being operatively configured for mounting the brake cylinder such that a return spring of the brake cylinder abuts directly or via a thin foil cover of the brake cylinder against an inner surface of the flange, the cover requiring support on the flange for operational use of the return spring, which return spring reacts against the flange when the brake cylinder is operated.

* * * * *